US010161437B2

(12) United States Patent
Geller

(10) Patent No.: US 10,161,437 B2
(45) Date of Patent: Dec. 25, 2018

(54) RETAINING ELEMENT

(71) Applicant: Wolfgang-Peter Geller, Garlstorf (DE)

(72) Inventor: Wolfgang-Peter Geller, Garlstorf (DE)

(*) Notice: Subject to any disclaimer, the term of this patent is extended or adjusted under 35 U.S.C. 154(b) by 84 days.

(21) Appl. No.: 15/359,063

(22) Filed: Nov. 22, 2016

(65) Prior Publication Data

US 2017/0152882 A1 Jun. 1, 2017

(30) Foreign Application Priority Data

Nov. 26, 2015 (DE) .................... 20 2015 106 449 U

(51) Int. Cl.
| | |
|---|---|
| *F16B 39/10* | (2006.01) |
| *F16B 39/24* | (2006.01) |
| *A45F 3/14* | (2006.01) |
| *G03B 17/02* | (2006.01) |
| *G03B 17/56* | (2006.01) |
| *F16M 11/04* | (2006.01) |
| *F16M 11/14* | (2006.01) |
| *F16M 13/04* | (2006.01) |
| *A45F 5/00* | (2006.01) |

(52) U.S. Cl.
CPC ............... *F16B 39/24* (2013.01); *A45F 3/14* (2013.01); *A45F 5/00* (2013.01); *F16M 11/041* (2013.01); *F16M 11/14* (2013.01); *F16M 13/04* (2013.01); *G03B 17/02* (2013.01); *G03B 17/56* (2013.01); *G03B 17/561* (2013.01); *G03B 17/566* (2013.01); *A45F 2003/142* (2013.01); *A45F 2005/006* (2013.01); *A45F 2200/0533* (2013.01); *F16M 2200/00* (2013.01)

(58) Field of Classification Search
CPC ........ F16B 39/08; F16B 39/10; F16B 39/103; F16B 39/20; F16B 39/24
USPC ................................. 411/119, 120, 123–124
See application file for complete search history.

(56) References Cited

U.S. PATENT DOCUMENTS

| | | | | |
|---|---|---|---|---|
| 277,706 | A * | 5/1883 | Gilgour | F16B 39/108 |
| | | | | 411/123 |
| 820,324 | A * | 5/1906 | Taylor | F16B 39/08 |
| | | | | 411/197 |
| 1,026,812 | A * | 5/1912 | Lance | F16B 39/08 |
| | | | | 411/197 |

(Continued)

FOREIGN PATENT DOCUMENTS

WO 2008131135 A1 10/2008

*Primary Examiner* — Roberta S Delisle
(74) *Attorney, Agent, or Firm* — Sand & Sebolt

(57) ABSTRACT

A retaining element that is detachably securable to a connector that is securable to a threaded bushing embedded in the bottom of a camera housing for preventing the connector screw from loosening in the threaded bushing. The retaining element has a connecting section, a spacer section and a rear-engagement section. The connecting section detachably secures the retaining element to the connector screw. The spacer section adjoins the connecting section and extends along the bottom of the camera housing when the connector screw, with the retaining element secured thereto, is screwed into the threaded bushing. The rear-engagement section adjoins the spacer section and extends at an angle relative to the spacer section. The rear-engagement section engages behind a wall of the camera housing, in particular the rear wall that adjoins the bottom of the camera housing.

12 Claims, 6 Drawing Sheets

(56) References Cited

U.S. PATENT DOCUMENTS

| | | | | |
|---|---|---|---|---|
| 3,290,071 | A | * 12/1966 | Kusiak | B64C 11/04 |
| | | | | 403/316 |
| 5,014,892 | A | 5/1991 | Copeland | |
| 5,092,723 | A | * 3/1992 | Compton | B21J 15/12 |
| | | | | 411/120 |
| 6,471,457 | B2 | * 10/2002 | Nago | F16B 39/108 |
| | | | | 411/121 |
| 6,976,816 | B2 | * 12/2005 | Slesinski | F16B 39/103 |
| | | | | 411/120 |
| 7,316,533 | B2 | * 1/2008 | Tanimura | F16B 39/10 |
| | | | | 411/119 |
| 8,425,168 | B2 | * 4/2013 | Campau | F16B 39/32 |
| | | | | 411/251 |
| 2010/0237206 | A1 | 9/2010 | Barker | |
| 2013/0101280 | A1 | 4/2013 | Xu | |
| 2014/0226962 | A1 | 8/2014 | Henry | |

* cited by examiner

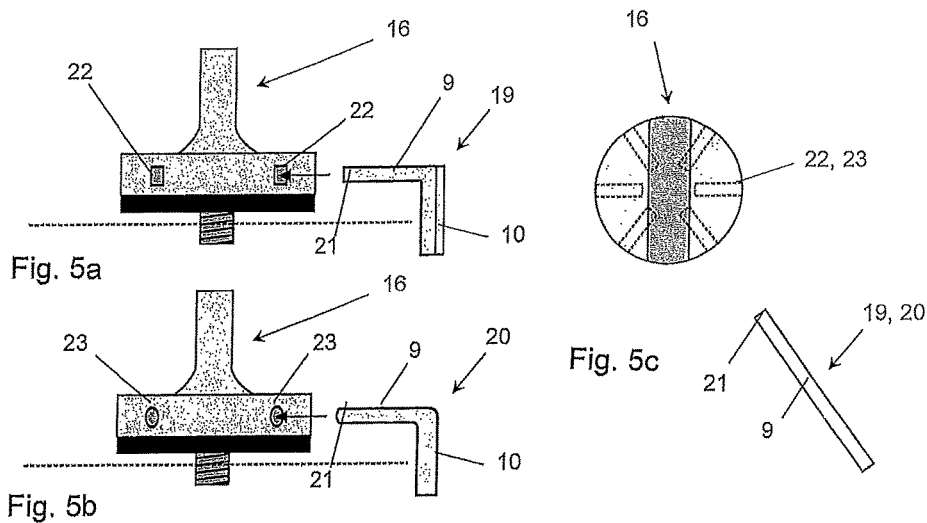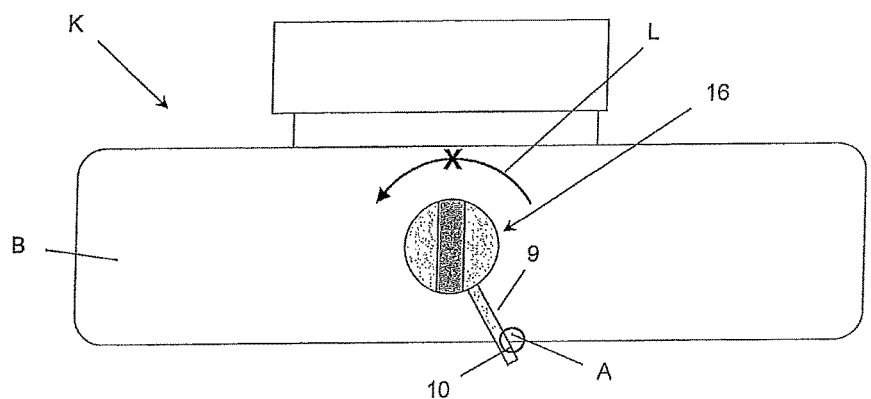

RETAINING ELEMENT

BACKGROUND OF THE INVENTION

Technical Field

The invention relates to a retaining element for securing a connector screw, which can be secured in a threaded bushing that is embedded in the bottom of a camera housing. It also relates to a connector screw provided with such a retaining element, and finally also to a connector for connecting a carrying strap to a camera, which contains such a connector screw with a retaining element.

Background Information

For many years, photo cameras and also video cameras have been equipped with threaded bushings embedded in the bottom of their respective camera housings, which were originally arranged and conceived for connecting the camera to a tripod using a tripod screw for securing. The corresponding threaded bushings are still used for this purpose. However, a further option for using these threaded bushings has recently been established, in which connectors are provided with suitable connector screws for the connection to carrying straps. A correspondingly equipped transport system for cameras is described, for example, in WO 2008/131135 A1.

In the case of the camera transport system shown there, a connector screw is screwed into the threaded bushing originally provided for the connection of a tripod screw on the bottom of a camera housing, and the connector connected to the connector screw is provided with carrying straps to be worn transversally over the torso or perpendicularly over the shoulder. With this way of carrying, the camera then hangs sideways on the user's body, and the entire weight of the camera is born by the connection between the threaded bushing and the connector screw. This weight can amount to several kilograms, especially when SLRs having larger lenses with higher focal length are used. In addition, if the camera transport system disclosed in the cited document is used, the screw connection formed is exposed to further strain by movements of the user when walking or also during the use of the camera for taking pictures; transverse movements, jogging movements and the like occur in such cases.

These movements can then result in the connector screw that has been screwed into the threaded bushing at the bottom of the camera housing, becoming loose. If this happens and if the connector screw is completely detached from the threaded bushing, in the worst case the camera attached to the transport system can drop down and hit the ground and be damaged. Considering the costs of high-quality cameras and lenses, in such a case a considerable financial loss, easily amounting to several thousand euros, can arise very quickly. Accordingly, said screw connection has to be made particularly secure.

To date, for the purpose of securing this connection, only elastic washers are used, which are placed between a cantilever section at the head part of the connector screw and the bottom of the camera housing and which upon tightening of the connector screw apply a compressive force directed against the screwing direction and thus make for an additional wedging of the threads of the connector screw in the corresponding counter threads of the threaded bushing. However, it has now turned out that, in particular in a situation in which the user of the camera support system runs quickly, this safeguard is not sufficient to deal with the violent up and down movements and impacts or shocks, and the connector screw will still become unscrewed from the threaded bushing.

SUMMARY

Accordingly, the invention addresses the problem of providing an additional securing means of this screw connection in such cases.

In order to achieve this object, the inventor provides a retaining element having the features of a connecting section for detachably securing the retaining element to the connector screw; a spacer section, which extends along the base of the camera housing and adjoins the connecting section when the connector screw, with the retaining element secured thereto, is screwed in the threaded bushing; and a rear-engagement section, which adjoins the spacer section and extends at an angle to the latter, for engaging behind a wall of the camera housing, in particular the rear wall, adjoining the bottom. Advantageous further developments of this retaining element include that the connecting section is formed as an open and elastically deformable clamping ring for the force-locking connection to a handle section of the connector screw. The retaining element further includes a closure section detachably connectable to the connecting section and complementing the latter into a ring completely surrounding the connector screw, wherein the spacer section and the rear-engagement section are arranged at the connecting section or at the closure section. The connecting section has a pin-like design for insertion into a suitable radial slot in a section of the connector screw and/or for compression between a collar section of the connector screw and the bottom of the camera housing, possibly with the interposition of an elastic support element. The rear-engagement section is integrally formed with the spacing section and has the overall shape of a hook. As a further aspect of the invention, a connector screw having such a retaining element as indicated above, and a connector for connecting a carrying strap to a camera, having a connector screw with such a retaining element, is disclosed.

The retaining element according to the invention is therefore detachably securable to a connector screw, which is securable to a threaded bushing, which is embedded in the bottom of a camera housing, and prevents the removal of the connector screw from the threaded bushing. This safeguard is achieved by the retaining element having the following three sections:

i) a connecting section for detachably securing the former to the connector screw;

ii) a spacer section, which extends along the base of the camera housing and adjoins the connecting section, when the connector screw, with the retaining element secured thereto, is screwed in the threaded bushing; and iii) a rear-engagement section, which adjoins the spacer section and extends at an angle to the latter, for engaging behind a wall of the camera housing, in particular the rear wall, adjoining the bottom.

The retaining element of the invention thus leads to an additional securing of the connector screw screwed into the threaded bushing against an unintentional release by very effective means appearing to be simple. This is ultimately achieved by connecting the retaining element to the connector screw screwed into the threaded bushing, for example using a screw head or a handle section thereof, and then arranging the retaining element in such a way that it engages behind a wall of the camera housing, in particular the rear wall adjoining the bottom, with the rear-engagement section, in such a way that in case of a possible rotation of the camera screw, this with the rear-engagement section forms a stop striking against the corresponding wall of the camera housing, in particular the rear wall, and there makes for a form-locked arrester.

At this point, it has to be emphasized that the detachable securing of the connecting section on the connector screw can also be realized in such a manner that the connecting section is not directly connected to the connector screw or a part thereof, but also, for instance, by clamping this connecting section between the connector screw and the bottom of the camera housing while at the same time securing the rotational position of the retaining element relative to the connector screw, possibly even based on the interposition of further elements, for example an elastic support element such as a rubber disk or the like as it is being used in existing connector screws.

According to an advantageous embodiment variant, the connecting section can be formed, in particular, as an open and elastically deformable clamping ring for the force-locking connection to a handle section of the connector screw. In this case, a corresponding corrugation can be formed on an inner side of the clamping ring, which, for a better non-rotatable purchase of the connecting section at the section of the connector screw, if the same is knurled or corrugated, as is often the case, said corrugation in addition to the clamping force and the frictional connection formed thereby results in a form fit, if it engages with the corresponding corrugation on the handle section of the connector screw. The connecting section designed as a clamping ring can then include means for closing around the connector screw, i.e. for forming a fixed ring. Such means may e.g. be a lug designed having latching tabs, latching grooves or comparable latching means, formed to an open side of the clamping ring, and a counterpart for threading the latch with corresponding complementary-shaped latching means.

In particular in such a solution, the rear-engagement section can also be arranged on a closure section that can be detachably connected to the connecting section and can be added to a ring completely surrounding the connector screw. For such a solution, the connecting section is particularly reliably and firmly secured to the connector screw and locked by attaching the closure section. In principle, it is, of course, also possible for the rear-engagement section to be formed on the connecting section and the closure section without the rear-engagement section, without the effect of the invention being any different.

Alternatively, and in a particularly simple embodiment variant, the connecting section of the retaining element can also have a pin-like design for insertion into a suitable radial slot in a section of the connector screw, for example in a handle section, and/or for compression between a collar section of the connector screw and the bottom of the camera housing, as already mentioned, possibly with the interposition of an elastic support element. Such a pin-like connecting section can be force-locked by a press-fit due to appropriate dimensioning of the outer contour of this pin section and of the inner contour of the slot, through the formation of an oversized outer contour, and possibly also by a slightly conical design of the pin-shaped connecting section and the corresponding counter-fit of the slot after it was pushed into the slot. Alternatively, a thread can also be formed here, which can be used to screw the pin-shaped connecting section into a corresponding counter-thread in the slot. For securing the connecting section of the connector screw by compressing it between a collar section thereof and the bottom of the camera housing, for instance, an intermediate elastic support member, for instance, a rubber washer, may be provided with corresponding recesses into which the pin-shaped connecting section can be inserted. If the elastic support element is then secured in a rotationally fixed manner to the connector screw, the required securing of the retaining element at the connector screw relative to the connector screw results.

In principle, other designs of the connecting section are also conceivable and possible, the person skilled in the art being able to determine corresponding design variants on the premise that a connection shall be created, which ensures securing of the retaining element on the connector screw that is secured against twisting and pulling.

It is also apparent that a connector screw, which is also described in the invention, and which has the retaining element described above, offers the advantage that it can be secured much better against unintentional loosening from the threaded bushing at the bottom of a camera housing. In the same way, a connector for connecting a camera to a carrying strap, which has such a connector screw having the retaining element, can also be improved.

BRIEF DESCRIPTION OF THE SEVERAL VIEWS OF THE DRAWINGS

Further advantages and features of the invention will become apparent from the following description of exemplary embodiments. In the figures:

FIG. 5a shows an exemplary embodiment of a retaining element according to the invention in coaction with a connector screw;

FIG. 5b shows a shows another exemplary embodiment of a retaining element according to the invention in coaction with a connector screw;

FIG. 5c shows a further exemplary embodiment of a retaining element according to the invention in coaction with a connector screw;

FIG. 6 shows a top view similar to that of FIG. 2, of a camera bottom with a connector screw and retaining element arranged there, in the design of one of the exemplary embodiments shown in FIG. 5a-FIG. 5c;

The figures show selected exemplary embodiments of a retaining element according to the invention in coaction with a connector screw, or a connector having such a connector screw, in a very schematic drawing. These exemplary embodiments are described with reference to the figures in more detail below.

DETAILED DESCRIPTION

Figure 1:
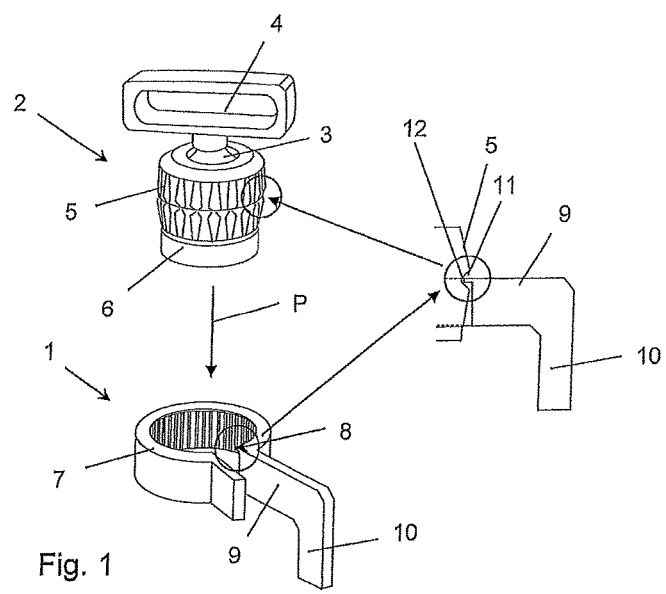
FIG. 1 shows three views of a first exemplary embodiment of a retaining element according to the invention in coaction with a connector screw.

FIG. 1 shows a first exemplary embodiment of a retaining element 1 according to the invention. This retaining element 1 serves to secure a connector screw of a connector 2 when connected to a threaded bushing at the bottom of a camera housing and serves to prevent an unintentional unscrewing thereof. The connector 2 has a strap eyelet 4 connected in an articulated manner via a ball bearing 3, through which a carrying strap can be threaded. A handle section 5 of the connector 2, which can be gripped and turned into the threaded bushing for screwing in the connector screw, is provided with a corrugation. Due to the perspective shown here, the screw connection to the thread of the connector screw is not visible. In the perspective shown here, it is hidden behind a rubber ring 6 connected to the handle section 5.

An arrow P is used to indicate here that, for securing the connector 2 or the connector screw, this handle section 5 is connected to a connecting section 7 of the retaining element 1 having the shape of an open ring. This connecting section 7 is formed from an elastically flexible material, for example, a plastic or a metal, and can be stretched by spreading the opening 8 apart, so as to guide it over the handle section 5. Due to the elasticity of the material, the connecting section jumps back into its initial annular position when an applied spreading force is removed. A spacer section 9 is formed integrally on the annular connecting section 7, which at its outer end once again merges integrally into a rear-engagement section 10, which projects downwards in a hook-like manner. In the detailed view shown on the right in FIG. 1, a circumferential collar 11 protruding inwards at an upper edge of the annular connecting section 7 is shown, which for locking an axial position of the retaining element 1 to the handle section 5 clicks in a circumferential groove 12 formed there and snaps into place there.

Figure 2A:
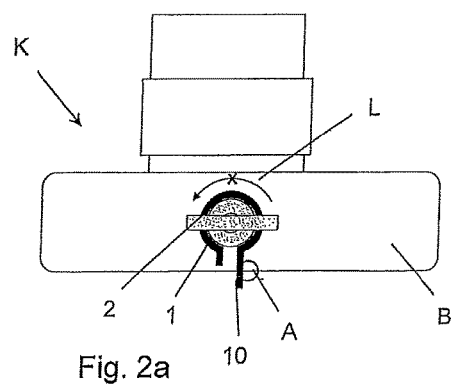
FIG. 2a shows a top view of a camera bottom with a connector screw screwed into the threaded bushing arranged there and secured with the retaining element according to FIG. 1.
Figure 2B:
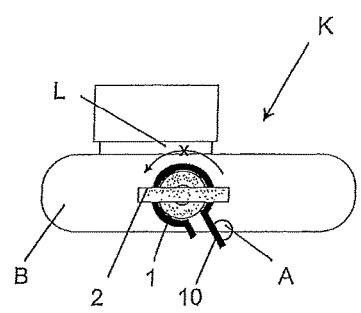
FIG. 2b shows a second top view of a camera bottom with a connector screw screwed into the threaded bushing arranged there and secured with the retaining element according to FIG. 1.

FIG. 2a and FIG. 2b show two representations of how the connector 2 is screwed into the bottom B of a housing of a camera K and how the retaining element 1 is attached. It can be seen here that the rear-engagement section 10, starting from the bottom B of the housing of the camera K, extends along the rear wall of this housing and thus forms a form-fitting stop. A comparison of the representations in FIG. 2a and FIG. 2b show that the widths or depths of the bottoms B of the housings of the camera K are different here, resulting in the stop point A designated by a circle changing correspondingly, i.e. the retaining element 1 is adapted to different camera formats. Furthermore, it can be seen that in the direction of the arrow L, which shows the direction of rotation for loosening the connector screw from the thread of the threaded bushing, a self-locking effect is established by pressing the rear-engagement section 10 further against the back wall of the camera K, thus preventing a release movement.

Figures 3A, 3B, 3C:
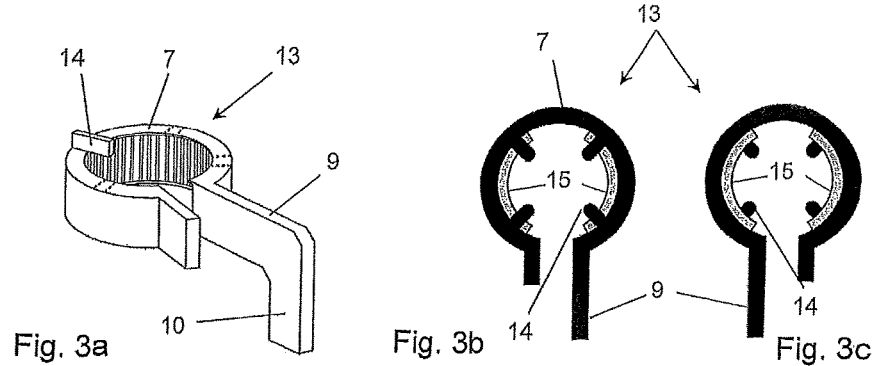
FIG. 3a shows an isometric view of a second embodiment of a retaining element according to the invention.
FIG. 3b shows a top view of a second embodiment of a retaining element according to the invention.
FIG. 3c shows a bottom view of a second embodiment of a retaining element according to the invention.
Figure 4:
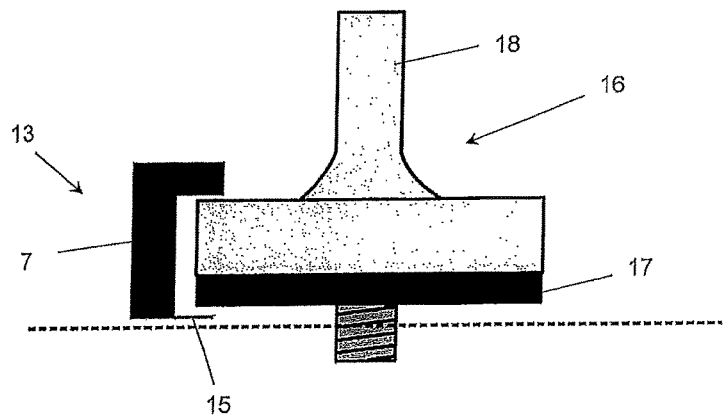
FIG. 4 shows a schematic representation of the retaining element of FIG. 3a-FIG. 3c in coaction with a connector screw.

FIG. 3a through FIG. 3c shows three different views of a second exemplary embodiment of a retaining element 13. This also has an annular connecting section 7, which is perforated in an opening 8, and which is connected to a spacer section 9 with a rear-engagement section 10 formed thereon. In the case of the retaining element 13 referred to herein, the axial securing at the connector screw is accomplished in a different manner than with the circumferential collar 11 in the previously described exemplary embodiment. Here, bars 14 are formed on an upper rim of the connecting section 7 (only one is shown in FIG. 3a, further bars are located at the positions indicated by dashed lines) also inwardly projecting leaf-like tongues 15 are located on an underside of the rim of the connecting section 7. These tongues 15 can be seen particularly well in FIGS. 3b (top view) and 3c (bottom view). As can be seen in FIG. 4, the bars 14 on the connecting section 7 overlap an upper edge of a connector screw of a connector 16, and the tongues 15 grip an elastic buffer disk 17 on the connector 16. The connector 16 is a different type of connector, having an eye-like opening (not shown in detail) for connection to a snap hook on an upwardly running, bar-shaped section 18.

FIG. 5a through FIG. 5c show two further exemplary embodiments of a retaining element according to the invention. Here a very simple retaining element 19 or 20, which in each case takes the form of a simple hook, is shown. Here, the connecting section is a pin-like section at the free end 21 of the spacer section 9, the outer contour of which correlates with the geometry of corresponding slots 22, 23, which are radially guided into the connector screw (into the connector 16). In the embodiment variant according to FIG. 5a, a rectangular cross-section is provided and in the embodiment variant according to FIG. 5b a circular cross-section is provided. In the case of the retaining elements 19, 20 shown here, a rear-engagement point section 10 is also formed in the manner of a hook, which in the mounted state, as shown in FIG. 6, i.e. when the connector 16 is screwed into the threaded bushing at the bottom B of the housing of a camera K using a connector screw, protrudes over the rear wall of this housing and is locked there at the stop point A. The design of the connecting element 7 is again such that, in the case of a force applied in the direction of the detaching direction L, the open ring is pulled tight and thus leads to an even stronger hold and an improved securing of the connector screw.

In FIG. 5c, the connector 16 can be seen with the connector screw and dashed lines indicating the slots 22, 23, which extend radially into the body of the connector 16 or the connector screw, and into which the connecting section 21 of the retaining element 19 or 20 is inserted. In this embodiment variant, the retaining element 19 or 20 is held in the slots 23 by a press-fit, the former having been force-pressed into one of these slots 22, 23 and then held there in a friction-locked manner, because of the correspondingly selected dimensions. To loosen the connector screw or the connector 16, the retaining element 19 or 20 is then withdrawn from the slot 22, 23. This may be effected for instance by means of a left turn and the unlocking caused thereby, or by simply pulling against a resistance. After the retaining element 19 or 20 has been released, the connector 16 including the connector screw can be detached from the threaded bushing at the bottom B of the housing of the camera K.

Figure 7:
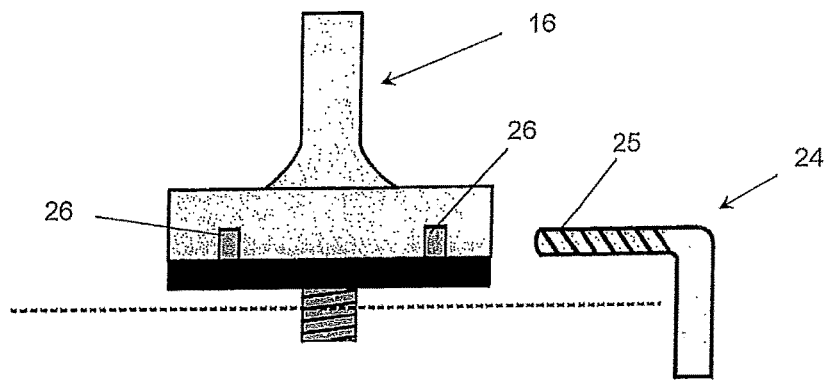
FIG. 7 shows a further exemplary embodiment of a retaining element with associated connector screw.
Figure 8:
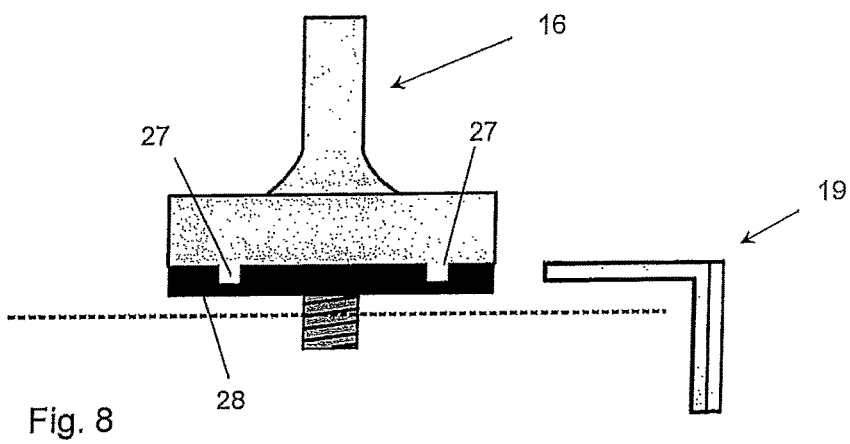
FIG. 8 shows a further exemplary embodiment of a retaining element with associated connector screw.
Figure 9:
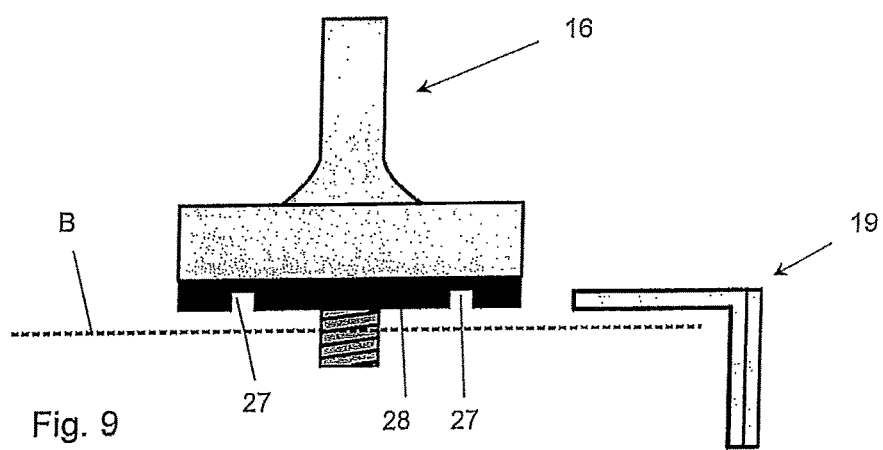
FIG. 9 shows a further exemplary embodiment of a retaining element with associated connector screw.

FIGS. 7 to 9 show further embodiment variants corresponding to the exemplary embodiments shown in FIG. 5. In FIG. 7, the retaining element 24 in the connecting section 25 is provided with a thread and is screwed into the slot 26, which is provided with an internal thread, on the connector 16 or the connector screw. In the exemplary embodiment according to FIG. 8, the retaining element 19 is inserted into recesses 27 of an elastic buffer member 28 (e.g. a rubber washer) fixedly connected e.g. glued, to the connector screw, and there clamped into the threaded bushing by further screwing in of the connector screw or the connector 16. FIG. 9 shows a similar embodiment variant, in which the clamping occurs between the buffer element 28 and the bottom B of the housing of the camera K.

Figure 10:
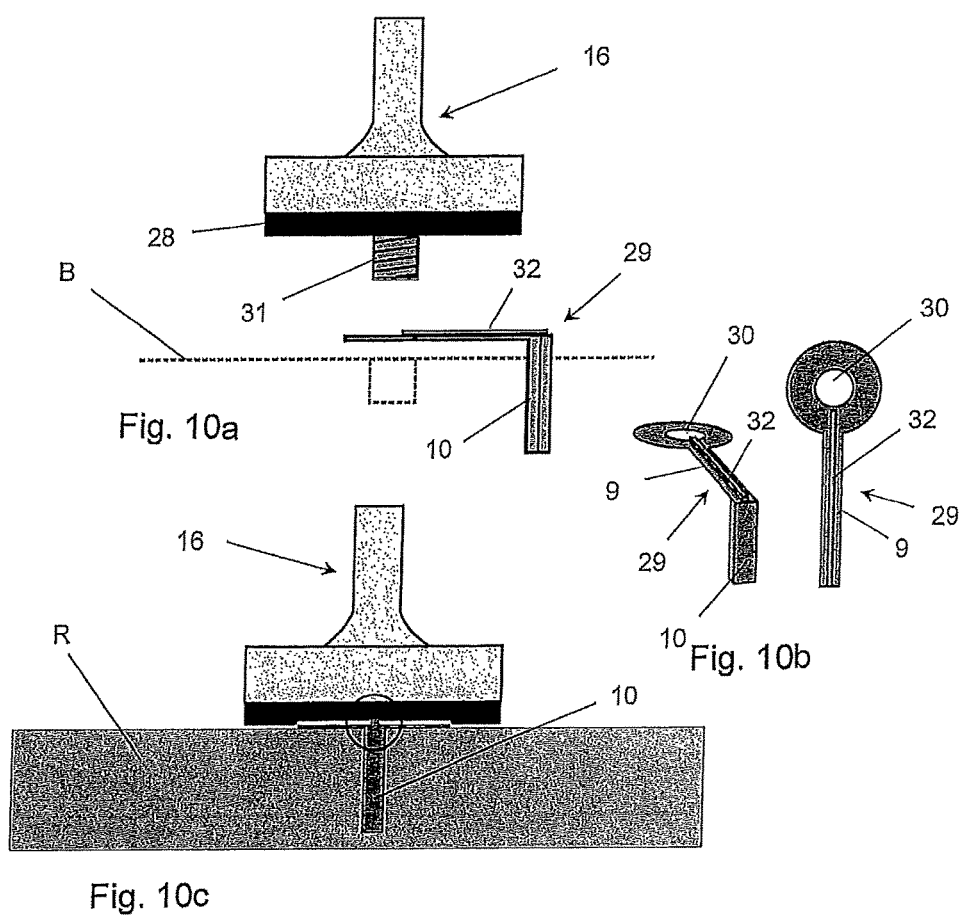
FIG. 10a shows an exemplary embodiment of a retaining element according to the invention in coaction with a connector screw.
FIG. 10b shows another exemplary embodiment of a retaining element according to the invention in coaction with a connector screw.
FIG. 10c shows a further exemplary embodiment of a retaining element according to the invention in coaction with a connector screw.

FIG. 10a through FIG. 10c shows a further exemplary embodiment of a retaining element 29 according to the invention. The connecting section of which is formed like a washer, flat and having an opening 30 through which the threaded part 31 of the connector screw of the connector 16 is passed. A band-shaped rise 32, which serves to prevent the retaining element 29 from rotating, is formed on a top-side of the spacer section 9. This band-shaped elevation 31, as shown by the encirclement in FIG. 10c, is pressed into the buffer element 28, thus obtaining a non-rotatable stop. This retaining element 29 also has a rear-engagement section 10, which, as indicated in FIG. 10c, is locked behind a rear wall R of a camera K, thus providing a safeguard against an unwanted unscrewing of the connector 16.

Figure 11:
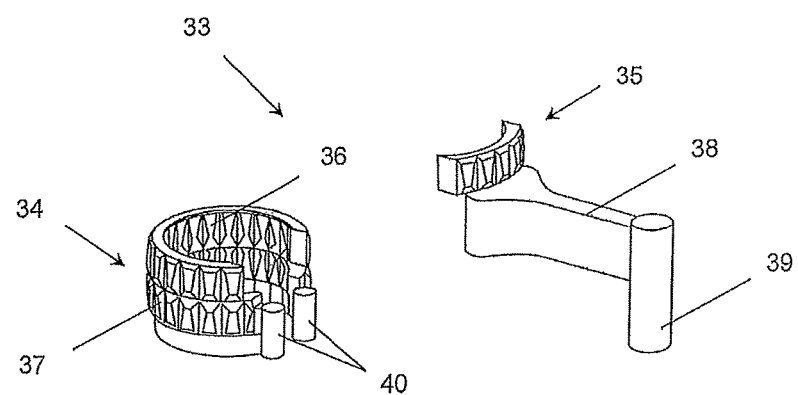
FIG. 11 shows yet another exemplary embodiment of a retaining element according to the invention in an open position.
Figures 12, 13:
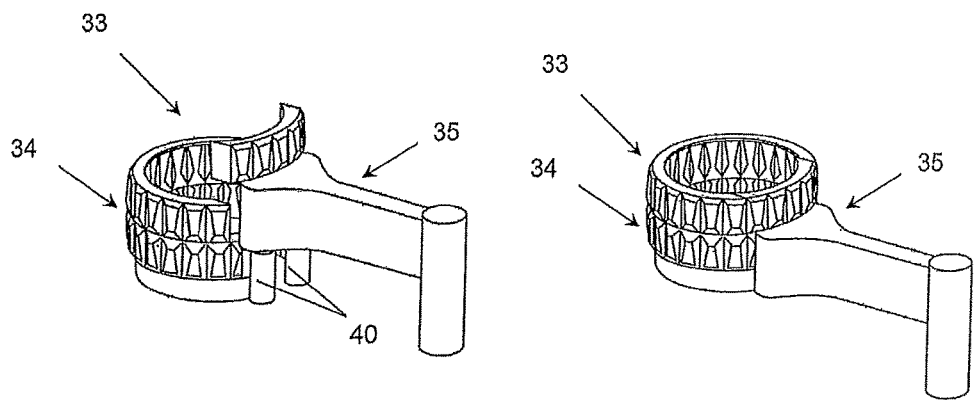
FIG. 12 shows the retaining element according to FIG. 11 in an intermediate position during closing or opening.
FIG. 13 shows the retaining element of FIG. 11 in a closed position, as is secured around and to a connector screw (not shown here).

Finally, FIGS. 11 to 13 show a further exemplary embodiment of a retaining element 33 according to the invention. This is in turn designed bipartite with a connecting section 34 formed as an open clamping ring and a closure section, which can be inserted into the annular opening of the connecting section 34 and then closes the latter.

On an inside of the connecting section 34, a corrugation 36 is formed, which is complementary to a corrugation on the outer surface of a connector screw and which connects the connecting section 34 to the connector screw. A corrugation applied to the outside of the connecting section 34 and of the closure section 35 is purely for appearances and can be omitted.

In the exemplary embodiment shown here, a rear-engagement section 39 integrally formed with a spacer section 38 is secured, via the spacer section 38 also integrally formed to the closure section 35, to the closure section 35. The connecting section 34 and the closure section 35 are preferably made of a plastic material.

At the edges of the annular opening of the connecting section 34, cylindrical connecting projections 40 running in parallel with their longitudinal axes are formed. Corresponding slots (not shown in the figures) formed in the connecting section, are guided over the former in the connecting section for the secured and positive connection of the two sections 34 and 35. In doing so, a certain undersize of the openings, preferably provided with a longitudinal slot, in comparison to the diameters of the connecting projections 40, provides an additional clamping action and friction-locked safeguarding of the connection.

The procedure for mounting the retaining element 33 is shown in FIGS. 12 and 13. To this end, the connecting section 34 is first set on the threaded bushing, for example, of the tripod thread bushing, arranged on the camera, in such a way that the annular opening points in the direction of the camera rear wall in such a way that, by attaching the closure section 35, the rear-engagement section 39 rests against a camera wall, in particular the camera rear wall. Then, as shown in FIG. 13, the closure section 35 is set on the connecting projections 40 and connected to the connecting section to form a tight ring (FIG. 13). When the closure section 35 is connected to the connecting section 34, a tensile force further closing the ring can also be applied, e.g. controlled by a slightly conical design of the connecting projections 40 or by a slightly tilted alignment with one another. Loosening and disassembly are then conducted in reverse order. In the exemplary embodiment shown in FIGS. 11 to 13, in a variant, the spacer section and the rear-engagement section can also be arranged, in particular formed, on the connecting section 34, instead of the closure section 35.

The exemplary embodiments shown in the preceding exemplary embodiments are aimed at further explanation of possible embodiment variants and their particular advantages and features but do not limit the invention. This invention is defined in its broad generality in the following claims.

LIST OF THE REFERENCE NUMERALS

1 Retaining element
2 Connector
3 Ball bearing
4 Strap eyelet
5 Handle section
6 Rubber ring
7 Connecting section
8 Opening
9 Spacer section
10 Rear-engagement section
11 Collar
12 Groove
13 Retaining element
14 Bars
15 Tongue
16 Connector
17 Elastic buffer disk
18 Bar-shaped Section
19 Retaining element
20 Retaining element
21 Free end
22 Slot
23 Slot
24 Retaining element
25 Connecting section
26 Slot
27 Recess
28 Buffer element
29 Retaining element
30 Opening
31 Threaded part
32 Band-shaped elevation
33 Retaining element
34 Connecting section
35 Closure section
36 Corrugation
37 Corrugation 38 Spacer section
39 Rear-engagement section
40 Cylindrical connecting projections
A Stop point
B Bottom
K Camera
L Arrow
P Arrow
R Rear wall

The invention claimed is:

1. A retaining element that is detachably secured at a connector screw embedded in a threaded bushing at a bottom of a camera housing for preventing the connector screw from loosening in the threaded bushing, the retaining element comprising the following components:
   i) a connecting section adapted to detachably secure the retaining element to the connector screw; wherein the connecting section is formed as an open and elastically deformable clamping ring and wherein the retaining element is adapted to have a force-locking connection to a handle section of the connector screw;
   ii) a spacer section which adjoins the connecting section and is adapted to extend along the bottom of the camera housing when the connector screw, with the retaining element secured thereto, is screwed in the threaded bushing; and
   iii) a rear-engagement section which adjoins the spacer section and extends at an angle relative to the spacer section, wherein the rear-engagement section is adapted to engage behind a wall of the camera housing, in particular the rear wall which adjoins the bottom of the camera housing; and
   a closure section detachably connectable to the connecting section and complementing the connecting section to form a ring adapted to completely surround a region of the connector screw, wherein the spacer section and the rear-engagement section are arranged at the connecting section or at the closure section.

2. The retaining element according to claim 1, wherein the connecting section has a pin adapted to be inserted into a radial slot in a section of the connector screw or compressed between a collar section of the connector screw and the bottom of the camera housing.

3. The retaining element according to claim 2, further comprising:
   an elastic support element adapted to be interposed between the connecting section and the bottom of the camera housing.

4. The retaining element according to claim 1, wherein the rear-engagement section is integrally formed with the spacing section and has an overall shape of a hook.

5. A connector screw securable to a threaded bushing embedded in the bottom of a camera housing, said connector screw having a retaining element according to claim 1, which is detachably fastened to the connector screw.

6. A connector for connecting a carrying strap to a camera, comprising a connector screw according to claim 5.

7. A retaining element that is detachably secured at a connector screw embedded in a threaded bushing at a bottom of a camera housing for preventing the connector screw from loosening in the threaded bushing, the retaining element comprising the following components:
   i) a connecting section adapted to detachably secure the retaining element to the connector screw;
   ii) a spacer section which adjoins the connecting section and is adapted to extend along the bottom of the camera housing when the connector screw, with the retaining element secured thereto, is screwed in the threaded bushing; and
   iii) a rear-engagement section which adjoins the spacer section and extends at an angle relative to the spacer section, wherein the rear-engagement section is adapted to engage behind a wall of the camera housing, in particular the rear wall which adjoins the bottom of the camera housing; wherein the connecting section has a pin adapted to be inserted into a radial slot in a section of the connector screw or compressed between a collar section of the connector screw and the bottom of the camera housing; and
   an elastic support element adapted to be interposed between the connecting section and the bottom of the camera housing.

8. The retaining element according to claim 7, wherein the connecting section is formed as an open and elastically deformable clamping ring and wherein the retaining element is adapted to have a force-locking connection to a handle section of the connector screw.

9. The retaining element according to claim 7, wherein the rear-engagement section is integrally formed with the spacing section and has an overall shape of a hook.

10. A connector screw securable to a threaded bushing embedded in the bottom of a camera housing, said connector screw having a retaining element according to claim 7, which is detachably fastened to the connector screw.

11. A connector for connecting a carrying strap to a camera, comprising a connector screw according to claim 10.

12. The retaining element according to claim 7, further comprising:
   a closure section detachably connectable to the connecting section and complementing the connecting section to form a ring adapted to completely surround a region of the connector screw, wherein the spacer section and the rear-engagement section are arranged at the connecting section or at the closure section.

* * * * *